US008978242B2

(12) United States Patent
Aoki et al.

(10) Patent No.: US 8,978,242 B2
(45) Date of Patent: Mar. 17, 2015

(54) CONNECTOR DEVICE HAVING CONNECTORS AND A LEVER JIG

(71) Applicant: Yazaki Corporation, Minato-ku, Tokyo (JP)

(72) Inventors: Hiroshi Aoki, Toyota (JP); Osamu Oshita, Toyota (JP); Akihiro Tsuruta, Fujieda (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/025,892

(22) Filed: Sep. 13, 2013

(65) Prior Publication Data

US 2014/0026406 A1 Jan. 30, 2014

Related U.S. Application Data

(63) Continuation of application No. PCT/JP2012/056430, filed on Mar. 13, 2012.

(30) Foreign Application Priority Data

Mar. 16, 2011 (JP) ................................ 2011-058085

(51) Int. Cl.

| | |
|---|---|
| ***B23P 19/00*** | (2006.01) |
| ***H01R 43/26*** | (2006.01) |
| ***H01R 13/629*** | (2006.01) |

(52) U.S. Cl.

CPC .......... *H01R 43/26* (2013.01); *H01R 13/62938* (2013.01); *H01R 13/62955* (2013.01)

USPC .................. 29/750; 29/758; 29/762; 310/157

(58) Field of Classification Search

USPC .................. 29/750–755, 764–762, 874, 884; 439/152–153, 157

See application file for complete search history.

(56) References Cited

U.S. PATENT DOCUMENTS

| | | | | |
|---|---|---|---|---|
| 3,177,567 | A | 4/1965 | Gehrman | |
| 5,066,244 | A * | 11/1991 | Kato et al. | 439/489 |
| 5,476,390 | A * | 12/1995 | Taguchi et al. | 439/157 |
| 6,183,277 | B1 * | 2/2001 | Okabe et al. | 439/157 |
| 7,976,322 | B2 * | 7/2011 | Matsumura et al. | 439/153 |
| 8,776,362 | B2 * | 7/2014 | Oshita et al. | 29/750 |
| 2009/0203240 | A1 | 8/2009 | Matsumura et al. | |
| 2014/0045358 | A1 * | 2/2014 | Oshita et al. | 439/345 |

FOREIGN PATENT DOCUMENTS

| | | |
|---|---|---|
| JP | H5-182739 A | 7/1993 |
| JP | H7-18393 U | 3/1995 |

(Continued)

*Primary Examiner* — Minh Trinh

(74) *Attorney, Agent, or Firm* — Marvin A. Motsenbocker; Mots Law, PLLC

(57) ABSTRACT

A connector device includes a pair of connectors and a lever jig. The lever jig includes: an opening/closing door configured to be displaced between an open position where the opening/closing door allows a connector to be attached to the lever jig and a close position where the opening/closing door prevents the connector positioned at an attachment position from being detached from the lever jig; a door holding portion configured to hold the opening/closing door at the close position; and an automatic door opening portion configured to move the opening/closing door at the close position to the open position against a holding force of the door holding portion at a point in time when a manipulation from a fitting manipulation start position to a fitting manipulation completion position is completed.

1 Claim, 14 Drawing Sheets

(56) References Cited

FOREIGN PATENT DOCUMENTS

| | | | |
|---|---|---|---|
| JP | 2009-187863 | A | 8/2009 |
| JP | 2011-150934 | A | 8/2011 |
| JP | 2011-159574 | A | 8/2011 |
| JP | 2011-258324 | A | 12/2011 |

* cited by examiner

CONNECTOR DEVICE HAVING CONNECTORS AND A LEVER JIG

CROSS REFERENCE TO RELATED APPLICATION

This application is a Continuation of PCT Application No. PCT/JP2012/056430, filed on Mar. 13, 2012, and claims the priority of Japanese Patent Application No. 2011-058085, filed on Mar. 16, 2011, the content of both of which is incorporated herein by reference.

BACKGROUND

1. Technical Field

The present invention relates to a lever jig capable of fitting between a pair of connectors with a low manipulation force and a connector device using the same.

2. Related Art

There have been proposed various connector devices in each of which a pair of connectors is configured to be able to be fitted by being manipulated with a low manipulation force through manipulation of a lever (refer to Japanese Unexamined Patent Application Publication No. 2009-187863). Among the connector devices like this, there has been proposed one that has a lever detachably provided to a connector, i.e., as a lever jig. By employing a lever jig, it becomes possible to carry out the work of fitting a plurality of connector devices and to actualize reduction of parts cost and the like. Examples related to such lever jigs and connector devices using thereof are illustrated in FIGS. 1 to 4. An explanation will be given below.

A connector device 100 is provided with a lever jig 101, and a female connector 120 and a male connector 130, which are a pair of connectors, as illustrated in FIG. 1.

The lever jig 101 is provided with a connector attachment portion 102 and a lever body 110, which is supported by the connector attachment portion 102 so as to be freely movable, as specifically illustrated in FIG. 2. The connector attachment portion 102 has a pair of side walls 103 and a joint wall portion 104 joining thereof. On the top ends of the pair of side walls 103, there are provided upper stopper pieces 103*a* inwardly protruding to each other. The pair of side walls 103 are configured so that the female connector 120 is enabled to be inserted into the inside thereof from the bottom face side. In each of the pair of side walls 103, there are provided connector engagement lugs 105 inwardly protruding at plural locations. On the outer surface of the pair of side walls 103, a pair of support pins 106 are provided so as to protrude. In the pair of side walls 103, there are provided a pair of temporary engagement holes 107 and are also provided guide slits 108 which are communicated to the temporary engagement holes 107, respectively. In each of the pair of side walls 103 and underneath the temporary engagement hole 107, there is provided a lever stopper portion 109 so as to protrude.

The lever body 110 is provided with a pair of arm portions 111 and a manipulation portion 112, which joins between the pair of arm portions 111 at the top ends thereof. On the inner face side of the pair of arm portions 111, a pair of pin receiving holes 113 are provided. The pair of support pins 106 of the connector attachment portion 102 are inserted into the pair of pin receiving holes 113. The lever body 110 is thereby enabled to rotate in between a fitting manipulation start position and a fitting manipulation completion position, taking the pair of support pins 106 as fulcrums. On the inner side of the pair of arm portions 111, a pair of boss attracting grooves 114 are provided. The pair of arm portions 111 each have a temporary engagement lug 115 provided so as to inwardly protruding. At the position where the lever body 110 impinges to the lever stopper portions 109, the temporary engagement lugs 115 are engaged with the temporary engagement holes 107. This position is the fitting manipulation start position of the lever body 110 (refer to FIG. 1).

As illustrated in FIG. 1, the female connector 120 and the male connector 130 are provided so as to be able to be fitted to/separated from each other. The female connector 120 and the male connector 130 respectively have a plurality of terminals (not illustrated), and, in the state in which both are fitted to each other, the plurality of terminals (not illustrated) of both of them are in contact with each other. In an upper portion of the female connector 120, there are provided flange portions 121 protruding from the both sides thereof. The male connector 130 has a connector fitting room 131, the top of which is opened. On the both side faces of the male connector 130, there are provided a pair of boss portions 132 and also a pair of temporary-engagement-release guide ribs 133 so as to protrude.

Next, the work of fitting the female connector 120 and the male connector 130 to each other will be described. The lever body 110 of the lever jig 101 is assumed to be set at the fitting manipulation start position. The female connector 120 is first inserted from the bottom face side of the connector attachment portion 102 of the lever jig 101. Upon insertion up to the full insertion position, the respective connector engagement lugs 105 of the connector attachment portion 102 are engaged to the flange portion 121 of the female connector 120. The lever jig 101 and the female connector 120 are thereby joined to each other.

Next, the female connector 120 is inserted to the connector fitting room 131 of the male connector 130. Then, the temporary-engagement-release guide ribs 133 of the male connector 130 cause the temporary engagement lugs 115 to be displaced to the release positions, by which rotary manipulation of the lever body 110 is enabled. Then, the pair of boss portions 132 of the male connector 130 come into the pair of boss attracting grooves 114 of the lever body 110. Thus, the female connector 120 and the male connector 130 are set at the fitting start position.

Next, a rotating manipulation of the lever body 110 from the fitting manipulation start position to the side of the fitting manipulation completion position is executed. Then, the pair of boss portions 132 of the male connector 130 move in the pair of boss attracting grooves 114 of the lever body 110, and the male connector 130 is attracted to the female connector 120. That is, the male connector 130 moves to the fitting position side. As illustrated in FIGS. 3 and 4, when the lever body 110 comes close to the fitting manipulation completion position as the rotating manipulation thereof advances, the left and right upper ends of the male connector 130 impinge to the respective connector engagement lugs 105 of the connector attachment portion 102. When the lever body 110 is further rotated to the fitting manipulation completion position from this situation, the male connector 130 is attracted to the fitting completion position and concurrently the respective connector engagement lugs 105 are brought to be displaced to the release positions. The work of fitting the female connector 120 and the male connector 130 is hence completed. Since the respective connector engagement lugs 105 are placed at the release positions, the lever jig 101 is able to be detached from the female connector 120.

SUMMARY

However, in the lever jig 101 and the connector device 100 using the same, if the relative position of the female connector

120 and the male connector 130 varies during the work of fitting, the connector engagement lugs 105 on the side where is more deeply attracted in at a position before the fitting manipulation completion position are displaced to the release positions. When some connector engagement lugs 105 are displaced to the release positions, the lever jig 101 becomes able to be detached from the female connector 120. Accordingly, there is a possibility to detach the lever jig 101 from the female connector 120 while the female connector 120 and the male connector 130 are in a state of being semi-fitted.

An object of the present invention is to provide a lever jig and a connector device using the same capable of reliably preventing a pair of connectors from being detached from each other in a state of being semi-fitted.

A first aspect of the present invention is a lever jig to be attached to either one of a pair of connectors and displace the pair of connectors from a fitting start position to a fitting completion position by applying a fitting force between the pair of connectors by a manipulation from a fitting manipulation start position to a fitting manipulation completion position, the lever jig including: an opening/closing door configured to be displaced between an open position where the opening/closing door allows the one of connectors to be attached to the lever jig and a close position where the opening/closing door prevents the one of connectors positioned at an attachment position from being detached from the lever jig; a door holding portion configured to hold the opening/closing door at the close position; and an automatic door opening portion configured to move the opening/closing door at the close position to the open position against a holding force of the door holding portion at a point in time when manipulation to the fitting manipulation completion position is completed in the manipulation from the fitting manipulation start position to the fitting manipulation completion position.

The automatic door opening portion may include a door trigger portion configured to press the opening/closing door at the close position to move towards the open position in a process of the manipulation from the fitting manipulation start position to the fitting manipulation completion position, and an urging portion configured to apply an urging force stronger than the holding force of the door holding portion towards the open position to the opening/closing door moved towards the open position by the door trigger portion.

The door holding portion may be a magnet configured to hold the opening/closing door at the close position by a magnetic force.

A second aspect of the present invention is a connector device including: a pair of connectors to be fitted to each other; and a lever jig to be attached to either one of the pair of connectors, and configured to apply a fitting force between the pair of connectors by a manipulation from a fitting manipulation start position to a fitting manipulation completion position and displace the pair of connectors from a fitting start position to a fitting completion position, wherein the one of connectors is provided attachable to the lever jig and detachable from an attachment position, and wherein the lever jig includes an opening/closing door configured to be displaced between an open position where the opening/closing door allows the one of connectors to be attached to the lever jig and a close position where the opening/closing door prevents the one of connectors positioned at the attachment position from being detached from the lever jig, a door holding portion configured to hold the opening/closing door at the close position, and an automatic door opening portion configured to move the opening/closing door at the close position to the open position against a holding force of the door holding portion at a point in time when manipulation to the fitting manipulation completion position is completed in the manipulation from the fitting manipulation start position to the fitting manipulation completion position.

According to the above configuration, as long as the lever jig is manipulated from the fitting manipulation start position to the fitting manipulation completion position and the manipulation to the fitting manipulation completion position is not completed, the opening/closing door is held at the close position by the door holding portion. Only after the manipulation is completed until the fitting manipulation completion position, the opening/closing door at the close position is automatically moved to the open position by the automatic door opening portion, which allows the lever jig to be detached from either of the connectors. Accordingly, since a pair of connectors cannot be detached from each other in a state of being semi-fitted, it is possible to reliably prevent the pair of connectors from being detached from each other in a state of being semi-fitted.

DETAILED DESCRIPTION

An embodiment of the present invention will be described below on the basis of the drawings.

Figure 1:
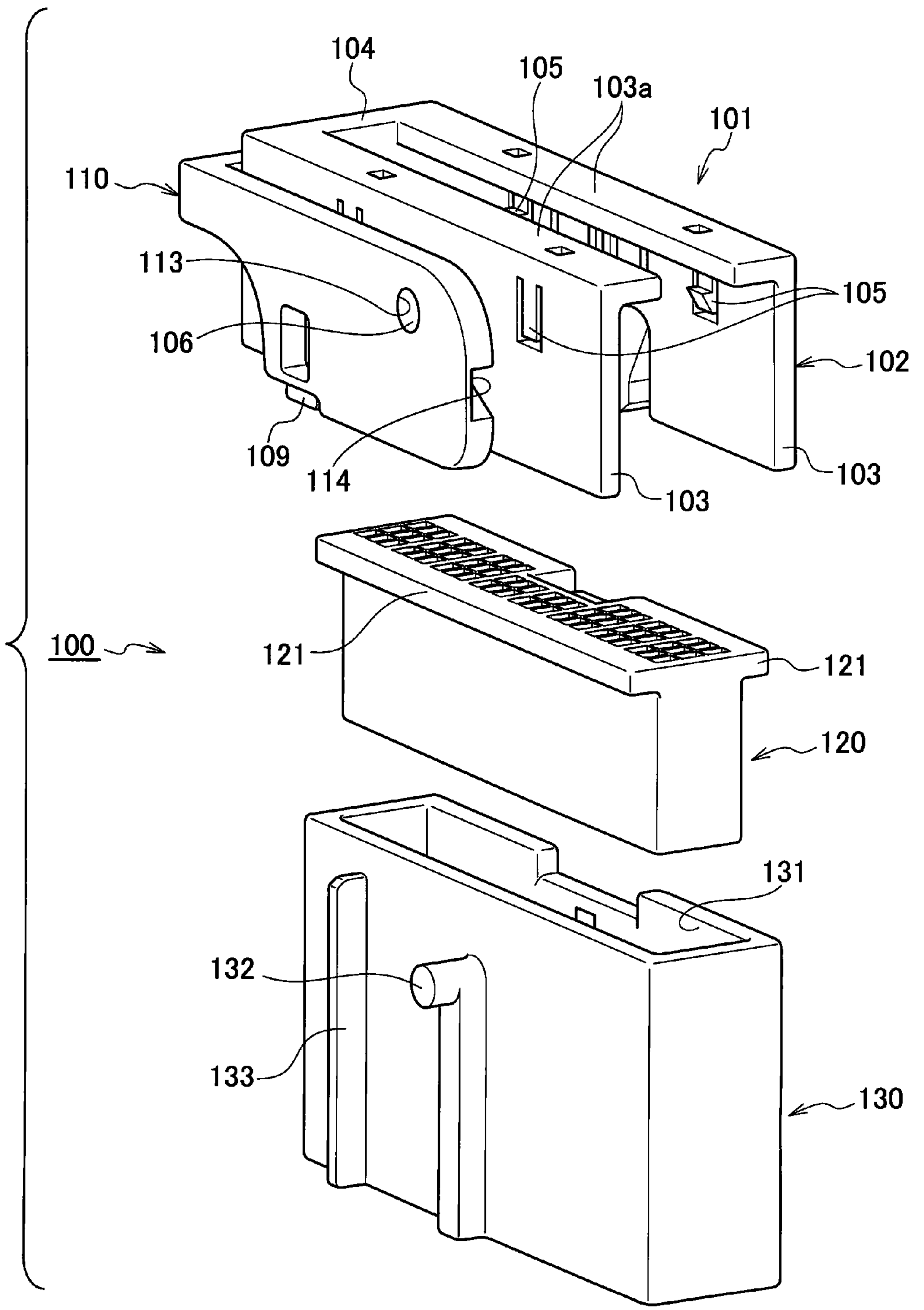
FIG. 1 RELATED ART
FIG. 1 is an exploded perspective view of a connector device, illustrating a related example.
Figure 2:
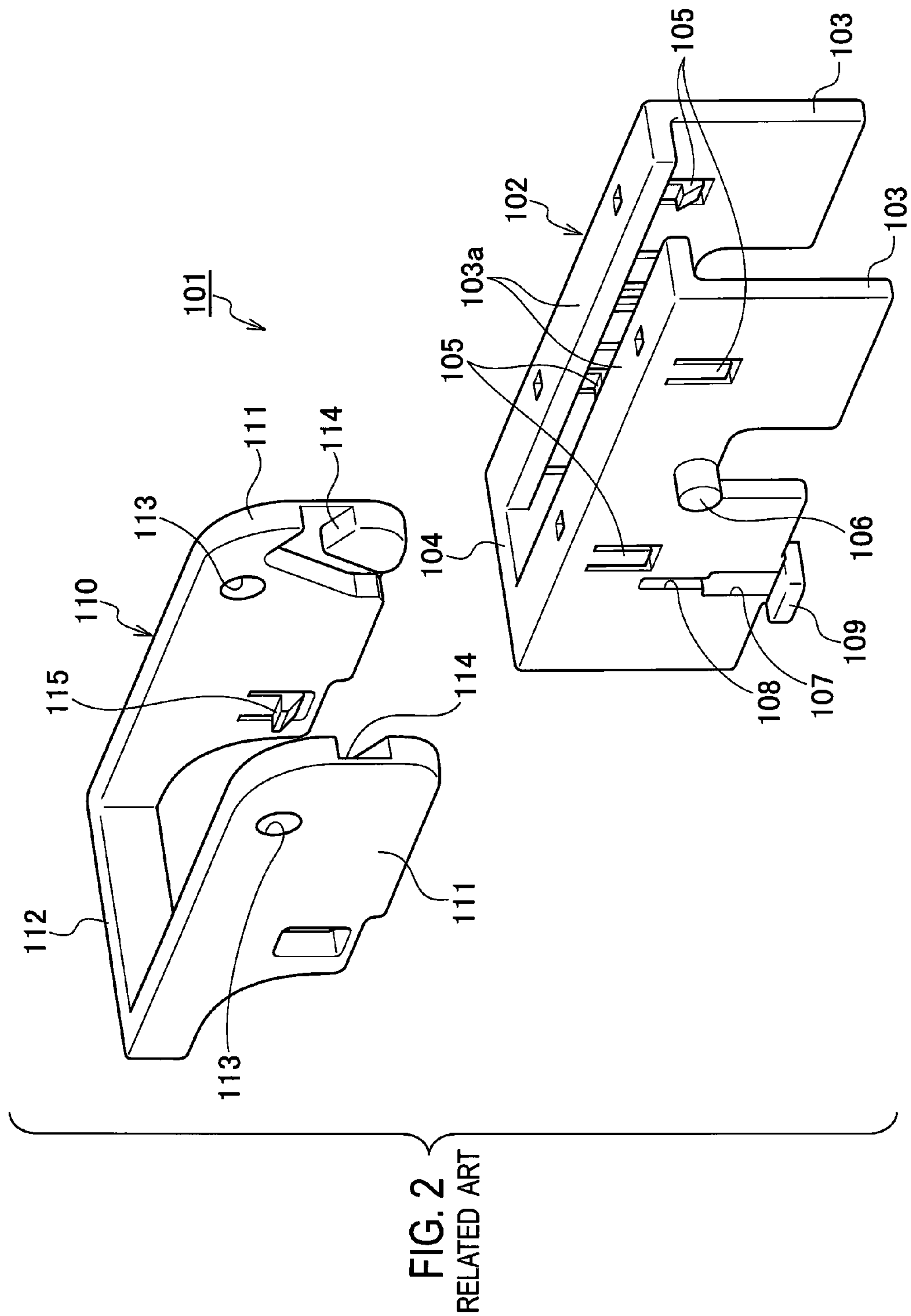
FIG. 2 RELATED ART
FIG. 2 is an exploded perspective view of a lever jig, illustrating the related example.
Figure 3:
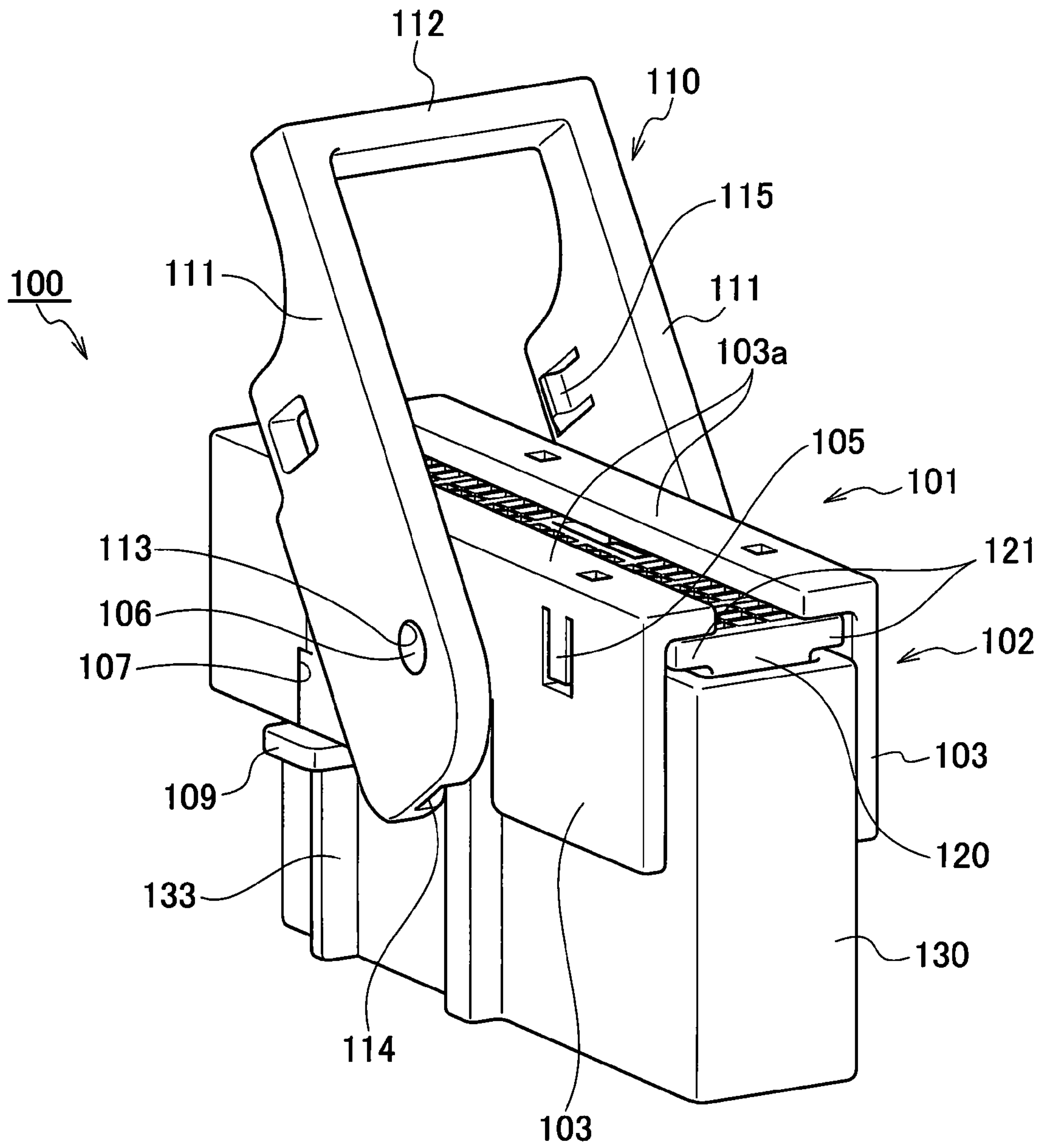
FIG. 3 RELATED ART
FIG. 3 is a perspective view illustrating the process of the work of fitting connectors, illustrating the related example.
Figure 4:
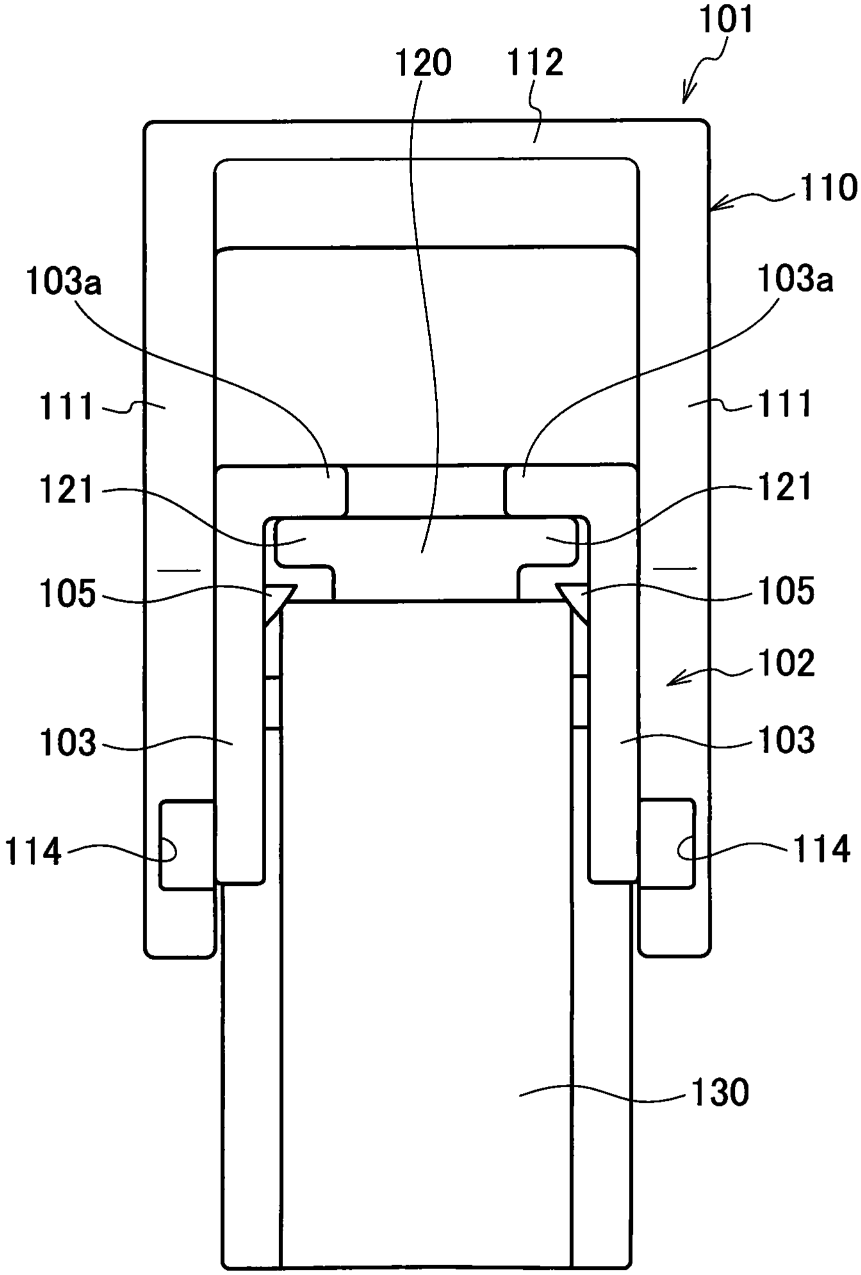
FIG. 4 RELATED ART
FIG. 4 is a side view illustrating the process of the work of fitting connectors, illustrating the related example.
Figure 5:
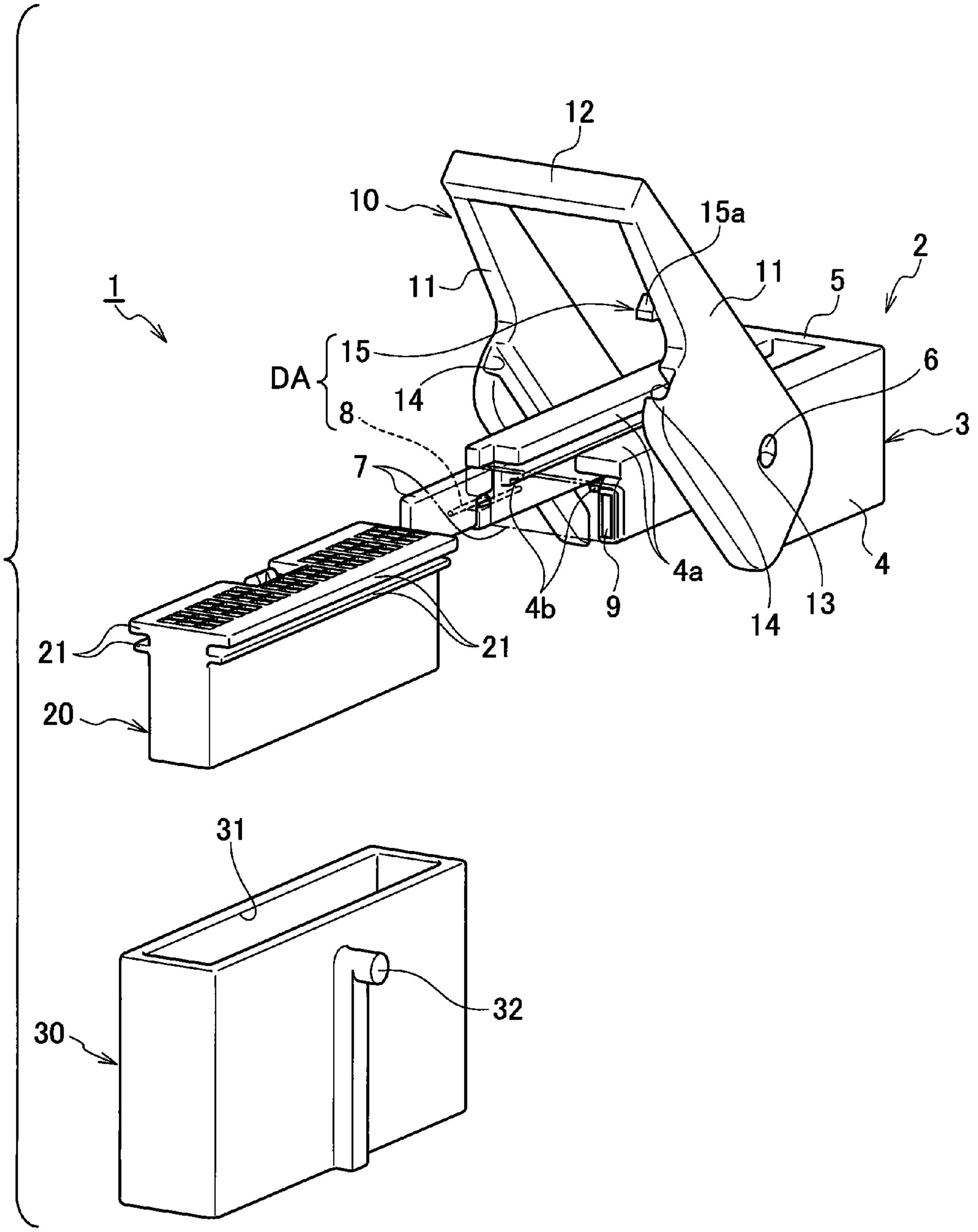
FIG. 5 is an exploded perspective view of a connector device, illustrating an embodiment of the present invention.

FIGS. 5 to 14 show the embodiment of the present invention. As illustrated in FIG. 5, a connector device 1 is provided with a lever jig 2, and a female connector 20 and a male connector 30, which are a pair of connectors.

The lever jig 2 is provided with a connector attachment portion 3 and a lever body 10, which is supported by the connector attachment portion 3 so as to be freely movable. The connector attachment portion 3 has a pair of side walls 4A, 4B and a joint wall portion 5 joining them, as specifically illustrated in FIG. 6. On the top ends of the pair of side walls 4A, 4B, there are provided upper wall pieces 4*a* inwardly protruding to each other. The connector attachment portion 3 has an opening on the front side. The pair of side walls 4A, 4B are configured so that the female connector 20 is enabled to be inserted into the inside thereof from the opened front side. On the inner face side of the pair of side walls 4A, 4B, there are provided a pair of slide rail portions 4*b* in parallel along the upper wall pieces 4*a* so as to protrude, respectively. The pair of slide rail portions 4*b* are provided throughout the length of the respective side walls 4A, 4B. On the outer surface of the pair of side walls 4A, 4B, a pair of support pins 6 are provided so as to protrude, respectively.

At the front end portion of the one side wall 4A, an opening/closing door 7 is freely rotatably supported. The opening/closing door 7 rotates in between the close position (the imaginary line position in FIG. 5) at which it partially blocks the opening on the front side by that the top end of the door abuts to the front end of the other side wall 4B and the open position (the solid line position in FIG. 5) at which it causes the opening on the front side to be opened by becoming flush with the one side wall 4A. The opening/closing door 7 is formed of a magnetic substance such as iron or the like. The opening/closing door 7 is configured so as to be subjected to a spring force of a spring 8, which is an urging portion. The spring 8 urges the opening/closing door 7 to the open position side.

At the front end portion of the other side wall 4B, there is provided a magnet 9, which is a door holding portion. The magnet 9 is embedded in a state in which its magnetization face is exposed at the front end of the other side wall 4B. The magnet 9 urges the opening/closing door 7 to the close position side by means of the attractive magnetic force, which is a holding force.

That is, to the opening/closing door 7, the spring force of the spring 8 acts in the direction toward the open position, while the magnetization face of the magnet 9 acts in the direction toward the close position. Since the attractive magnetic force of the magnet 9 is stronger than the spring force of the spring 8 at the close position, the opening/closing door 7 is held at the close position by means of the attractive magnetic force of the magnet 9. Since the spring force of the spring 8 is stronger than the attractive magnetic force of the magnet 9 at the open position, the opening/closing door 7 is held at the open position by means of the spring force of the spring 8. The position where the attractive magnetic force of the magnet 9 and the spring force of the spring 8 are balanced is set on the close position side a little with respect to the final displacement position in a door trigger portion described later.

At the front end portion and the top-face end portion of the other side wall 4B, a notch portion 4*c* is formed.

Figure 7:
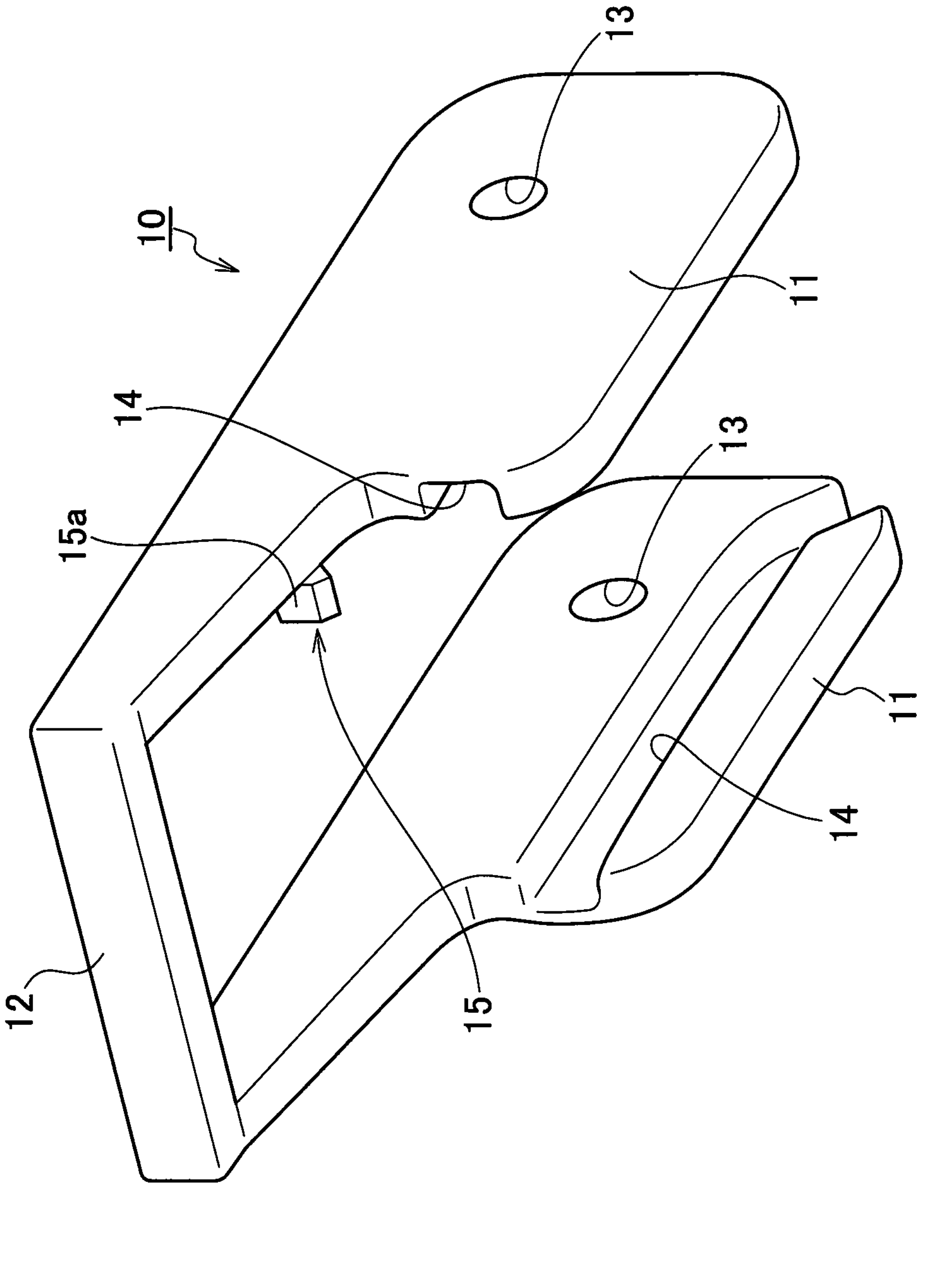
FIG. 7 is an exploded perspective view of the lever body of the lever jig, illustrating the embodiment of the present invention.

The lever body 10 is provided with a pair of arm portions 11 and a manipulation portion 12, which joins between the pair of arm portions 11 at the top ends thereof as specifically illustrated in FIG. 7. On the inner face side of the pair of arm portions 11, a pair of pin receiving holes 13 are provided. The pair of support pins 6 of the connector attachment portion 3 are inserted into the pair of pin receiving holes 13, respectively. The lever body 10 is thereby enabled to rotate in between a fitting manipulation start position and a fitting manipulation completion position, taking the pair of support pins 6 as fulcrums. On the inner side of the pair of arm portions 11, a pair of boss attracting grooves 14 are provided. The respective boss attracting grooves 14 are each opened with respect to the directly lower position at the fitting manipulation start position and the fitting manipulation completion position of the lever body 10. That is, the configuration is such that boss portions 32 of the male connector 30 described later are able to be inserted into/separated from the respective boss attracting grooves 14 at the fitting manipulation start position and the fitting manipulation completion position of the lever body 10.

Figure 8:
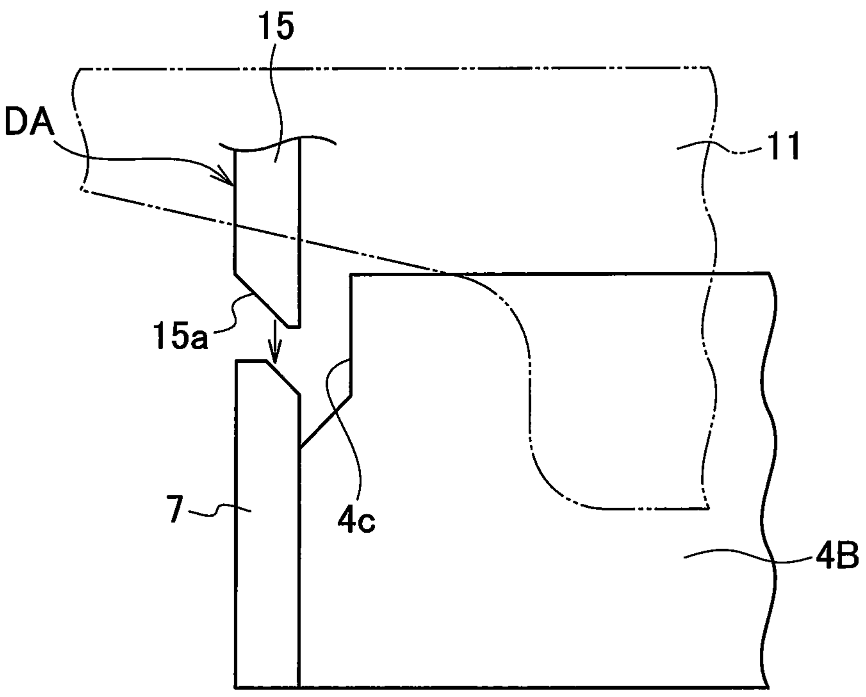
FIG. 8 is a side view of a key portion for explaining the process in which a door trigger portion displaces an opening/closing door to the open position side, illustrating the embodiment of the present invention.

On the one side of the arm portions 11, there is provided the door trigger portion 15 so as to protrude downward. The door trigger portion 15 enters into the notch portion 4*c* to press the opening/closing door 7 at the close position in the movement process of the lever body 10, and causes the opening/closing door 7 to move to the open position side as illustrated in FIG. 8. The face of the door trigger portion 15 interfering with the opening/closing door 7 is formed as a tapered face 15*a*. The door trigger portion 15 thereby gradually moves the opening/closing door 7 in response to the advance of movement of the lever body 10 to the fitting manipulation completion position. The fitting manipulation completion position of the lever body 10 is the position where the opening/closing door 7 is finally displaced. At this final displacement position of the opening/closing door 7 due to the door trigger portion 15, the spring force of the spring 8 becomes stronger than the attractive magnetic force of the magnet 9 due to the setting of the attractive magnetic force of the magnet 9 and the spring force of the spring 8 described above. For this reason, the opening/closing door 7 is automatically rotated to the open position side by means of the spring force.

That is, the door trigger portion 15 and the spring 8 constitute an automatic door opening portion DA that moves the opening/closing door 7 at the close position to the open position against the attractive magnetic force (holding force) of the magnet 9 at a point in time when manipulation to the fitting manipulation completion position is completed in the manipulation of the lever body 10 from the fitting manipulation start position to the fitting manipulation completion position.

Figure 6:
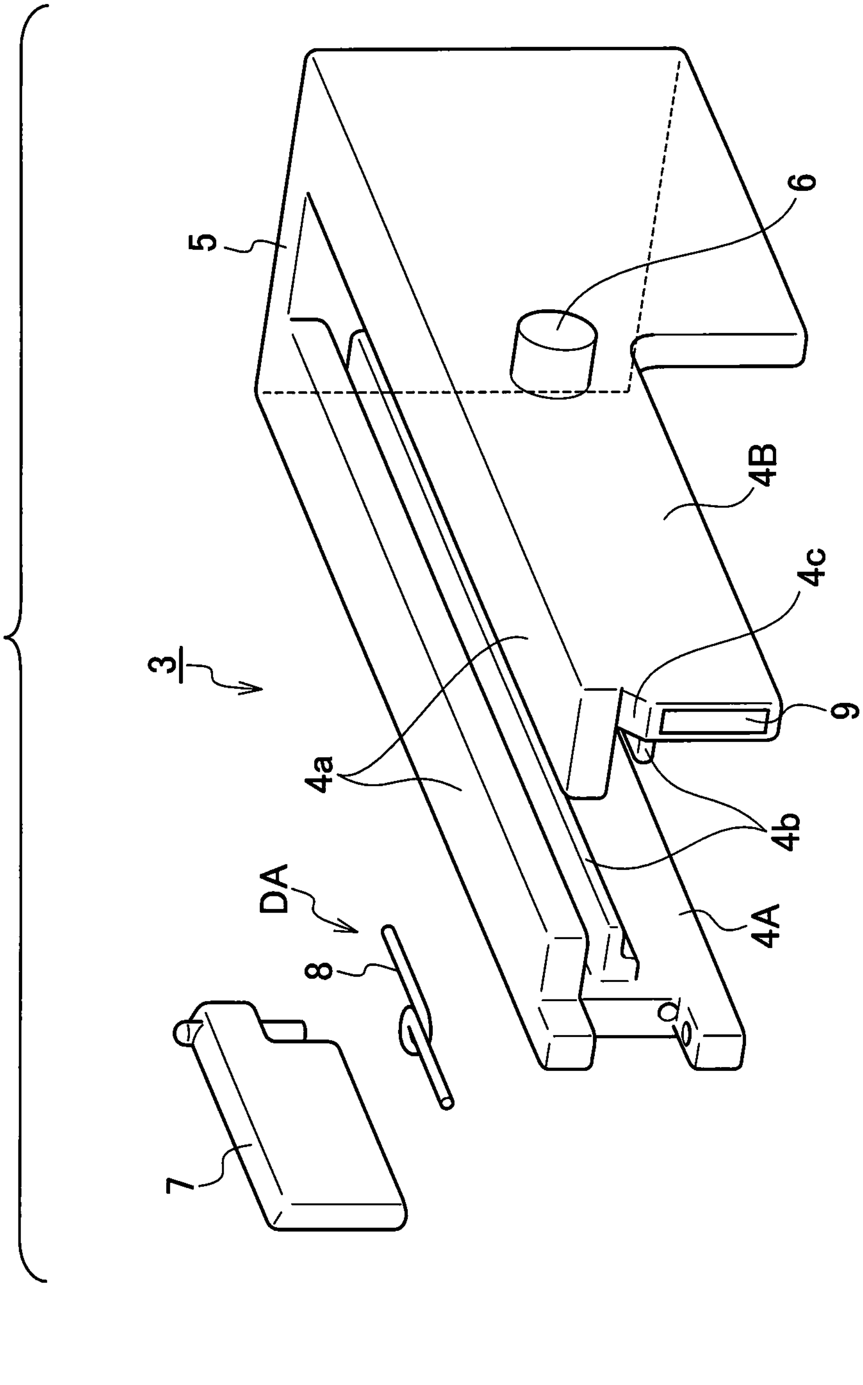
FIG. 6 is a perspective view of the connector attachment portion of a lever jig, illustrating the embodiment of the present invention.

The female connector 20 and the male connector 30 are provided so as to be able to be fitted/separated to/from each other as illustrated in FIGS. 5 and 6. The female connector 20 and the male connector 30 respectively have a plurality of terminals (not illustrated), and the plurality of terminals (not illustrated) of the both of them are in contact with each other in the state of being fitted.

On an upper portion of the both side faces of the female connector 20, a pair of two threads of guide rib 21 are provided so as to protrude. The two threads of guide rib 21 are provided throughout the length of the side face of the female connector 20. After alignment is carried out so that the slide rail portion 4*b* of the connector attachment portion 3 enters between the two threads of guide rib 21, the female connector 20 is slide-inserted into the connector attachment portion 3. By means of the motion of slide insertion, the female connector 20 can be attached to the connector attachment portion 3.

The male connector 30 has a connector fitting room 31, the top of which is opened. On the both side faces of the male connector 30, a pair of boss portions 32 are provided so as to protrude.

Figure 9:
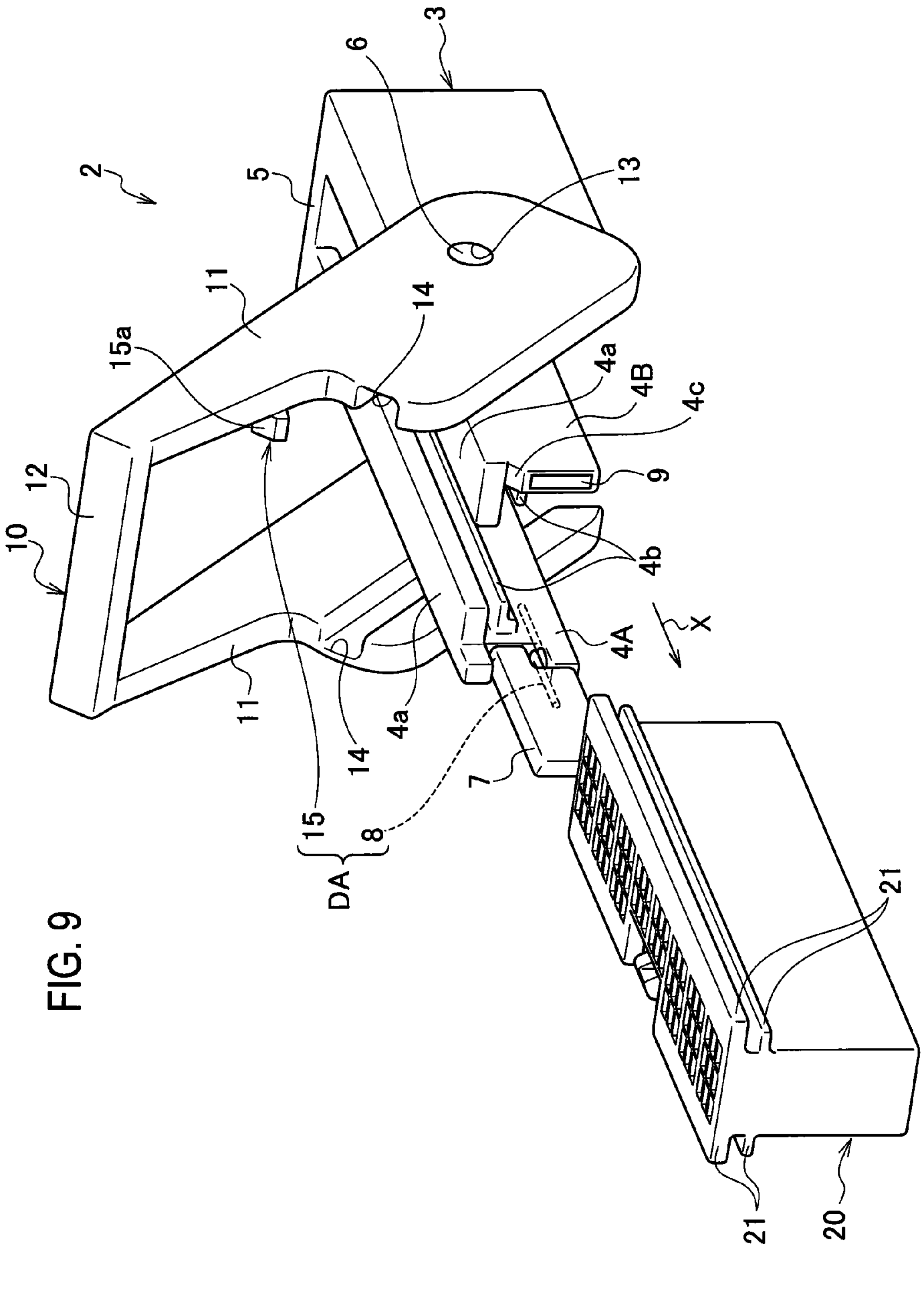
FIG. 9 is a perspective view illustrating the process of the work of fitting connectors, illustrating the embodiment of the present invention.
Figure 10:
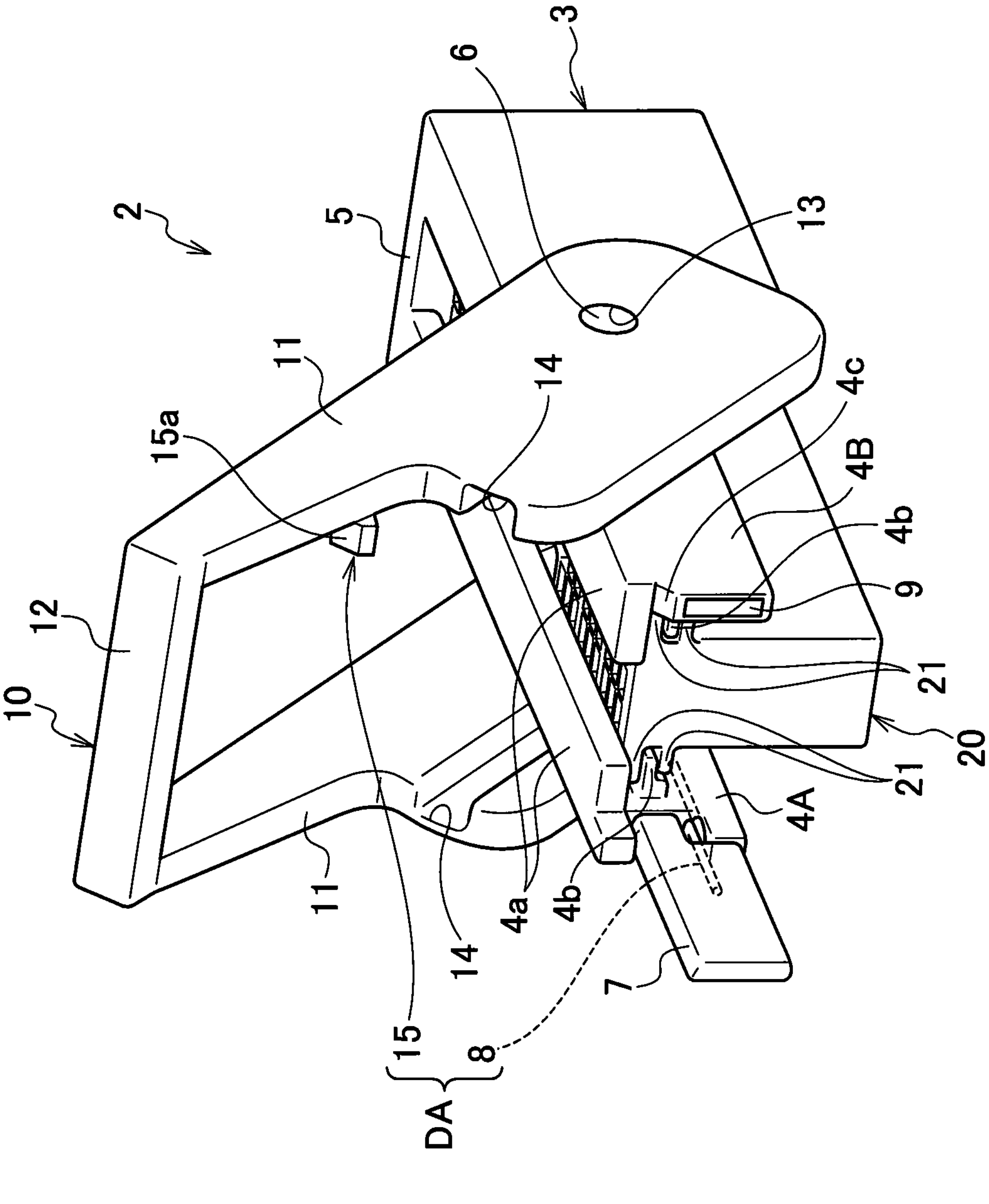
FIG. 10 is a perspective view illustrating the process of the work of fitting connectors, illustrating the embodiment of the present invention.
Figure 11:
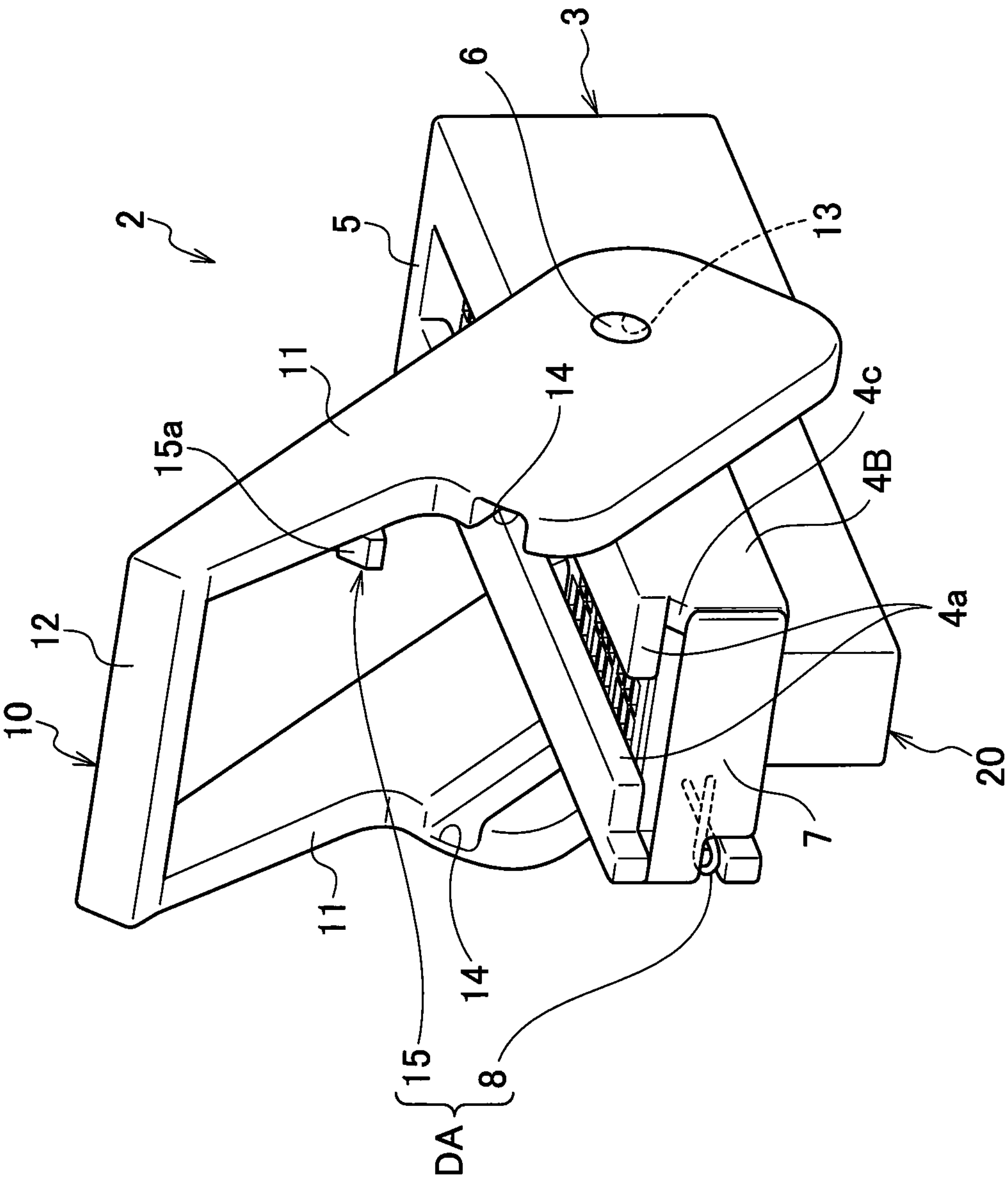
FIG. 11 is a perspective view illustrating the process of the work of fitting connectors, illustrating the embodiment of the present invention.

Next, the work of fitting the female connector 20 and the male connector 30 to each other will be described. The lever body 10 of the lever jig 2 is assumed to be set at the fitting manipulation start position. The opening/closing door 7 is first placed at the open position as illustrated in FIG. 9, the female connector 20 is slide-inserted from the front side of the connector attachment portion 3 of the lever jig 2. The top end of the female connector 20 is inserted up to the attachment position where it impinges to the rear wall of the connector attachment portion 3 as illustrated in FIG. 10, and the opening/closing door 7 is brought to rotate from the open position to the close position against the spring force of the spring 8 as illustrated in FIG. 11. The opening/closing door 7 is held at the close position by means of the attractive magnetic force of the magnet 9. The female connector 20 is positioned at the attachment position of the connector attachment portion 3, and cannot be detached from the connector attachment portion 3. Setting of the female connector 20 to the lever jig 2 is thus completed.

Figure 12:
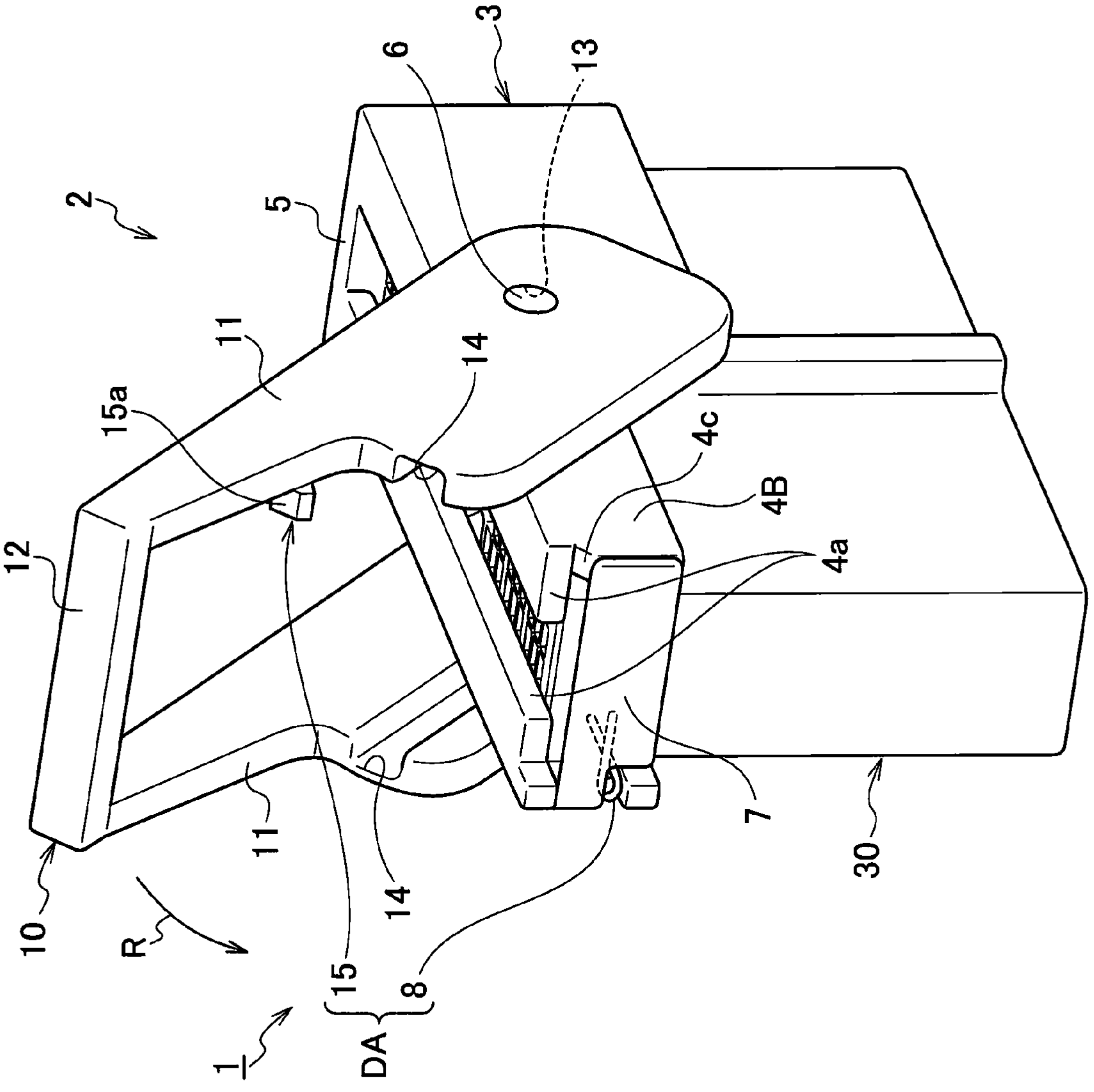
FIG. 12 is a perspective view illustrating the process of the work of fitting connectors, illustrating the embodiment of the present invention.

Next, the female connector 20 is inserted to the connector fitting room 31 of the male connector 30 as illustrated in FIG. 12. By this insertion, the pair of boss portions 32 of the male connector 30 enter the pair of boss attracting grooves 14 of the lever body 10. Then, the female connector 20 and the male connector 30 are set at the fitting start position.

Figure 13:
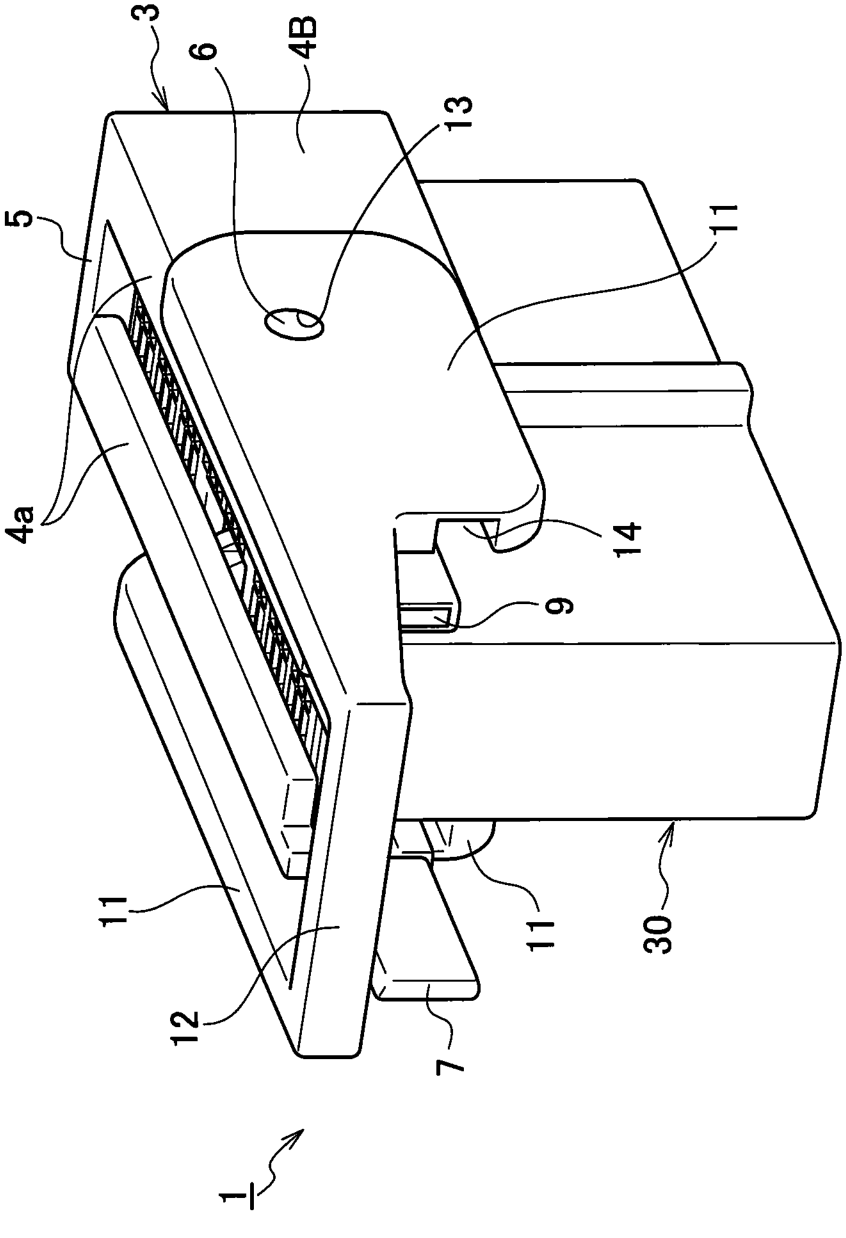
FIG. 13 is a perspective view illustrating the process of the work of fitting connectors, illustrating the embodiment of the present invention.
Figure 14:
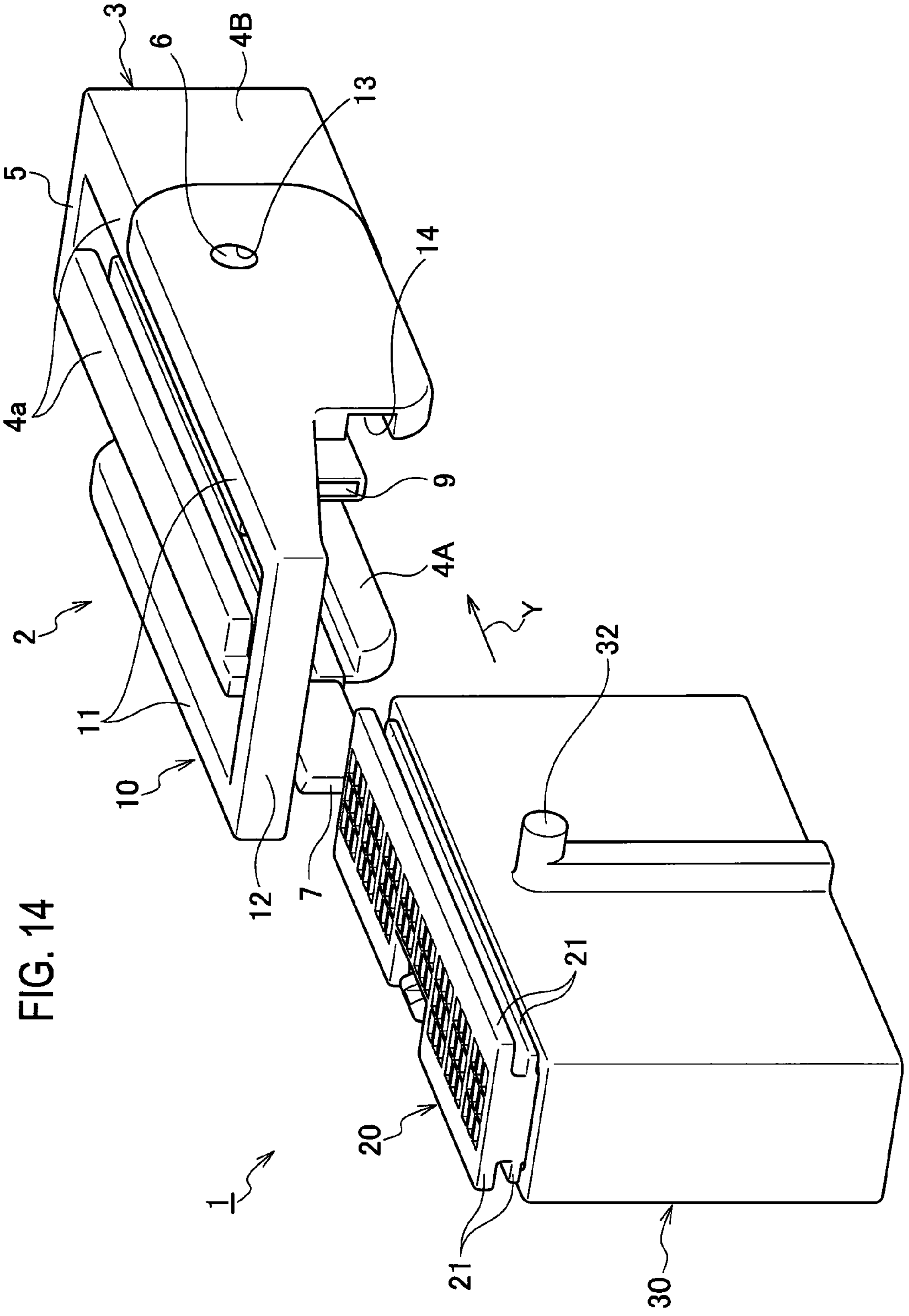
FIG. 14 is a perspective view illustrating the process of the work of fitting connectors, illustrating the embodiment of the present invention.

Next, a rotating manipulation of the lever body 10 from the fitting manipulation start position to the side of the fitting manipulation completion position (direction of arrow R in FIG. 12) is executed. Then, the pair of boss portions 32 of the male connector 30 move in the pair of boss attracting grooves 14 of the lever body 10, and the male connector 30 is attracted to the female connector 20. That is, the male connector 30 moves to the fitting position side. When the lever body 10 comes close to the fitting manipulation completion position as the rotating manipulation thereof advances, the door trigger portion 15 of the lever body 10 abuts to the opening/closing door 7. When the rotating manipulation further advances from this situation, the opening/closing door 7 moves to the open position side by means of the pressing force of the door trigger portion 15 against the attractive magnetic force of the magnet 9. And, when the lever body 10 is rotated to the fitting manipulation completion position, the opening/closing door 7 moves to the final displacement position due to the door trigger portion 15. At this final displacement position, the spring force of the spring 8 acting on the opening/closing door 7 becomes larger than the attractive magnetic force of the magnet 9 for the first time. Then, the opening/closing door 7 automatically moves to the open position by means of the spring force as illustrated in FIG. 13. Moreover, when the lever body 10 rotates to the fitting manipulation completion position, the male connector 30 is attracted to the fitting completion position. This allows the lever jig 2 to be detached from the female connector 20. The lever jig 2 is detached from the female connector 20 by being slid in the direction of arrow Y in FIG. 14, by which the work of fitting connectors is completed.

As explained above, the lever jig 2 is provided with the opening/closing door 7, which is able to be displaced in between the open position allowing the female connector 20 to be attached to the lever jig 2 and the close position preventing the female connector 20 positioned at the attachment position from moving toward the detachment direction; the magnet 9 holding the opening/closing door 7 at the close position; and the automatic door opening portion DA, which moves the opening/closing door 7 at the close position to the open position against the holding force of the magnet 9 at a point in time when manipulation to the fitting manipulation completion position is completed in the manipulation from the fitting manipulation start position to the fitting manipulation completion position. Accordingly, unless the lever jig 2 is manipulated from the fitting manipulation start position to the fitting manipulation completion position and the manipulation is completed until the fitting manipulation completion position, the opening/closing door 7 is held at the close position by means of the magnet 9, and it is not until the manipulation is completed that the opening/closing door 7 at the close position automatically moves to the open position by means of the automatic door opening portion DA and the lever jig 2 is allowed to be detached from the female connector 20. From the above, since the female connector 20 and the male connector 30 cannot be detached from each other in a state of being semi-fitted, it is possible to reliably prevent the female connector 20 and the male connector 30 from being detached from each other.

The automatic door opening portion DA is constituted of the door trigger portion 15, which presses the opening/closing door 7 at the close position to move to the open position side in the movement process from the fitting manipulation start position to the fitting manipulation completion position, and the urging portion that applies an urging force stronger than the attractive magnetic force of the magnet 9 to the opening/closing door 7, which has been moved to the open position side by the door trigger portion 15, toward the open position side. As with this embodiment, since the door trigger portion 15 is able to be constituted and the urging portion is able to be constituted of the spring 8, it is possible to simply constitute the automatic door opening portion DA.

The door holding portion is the magnet 9, which holds the opening/closing door 7 at the close position by means of the magnetic force. Accordingly, it is possible to constitute the door holding portion.

Although the whole of the opening/closing door 7 is formed of a magnetic substance in this embodiment, only a portion thereof displaced in opposition to the magnet 9 may be formed of the magnetic substance, or a magnetic substance part may be provided so as to attach to the opening/closing door 7. Although the opening/closing door 7 is formed of the magnetic substance and the magnet 9 is provided to the connector attachment portion 3 in this embodiment, the magnet 9 may be provided to the opening/closing door 7 and the connector attachment portion 3 may be formed of the magnetic substance. Only a portion of the connector attachment portion 3 displaced in opposition to the magnet 9 may be formed of the magnetic substance, or a magnetic substance part may be provided so as to attach to the connector attachment portion 3. Magnets having opposite magnetic polarities may be provided to both the opening/closing door 7 and the connector attachment portion 3.

Although an embodiment of the present invention has been described above, the present invention is not limited to the above embodiment, but various modifications thereof are possible.

What is claimed is:

1. A connector device comprising:

a pair of connectors to be fitted to each other; and a lever jig to be attached to either one of the pair of connectors, and configured to apply a fitting force between the pair of connectors by a manipulation from a fitting manipulation start position to a fitting manipulation completion position and displace the pair of connectors from a fitting start position to a fitting completion position, wherein the one of connectors is provided attachable to the lever jig and detachable from an attachment position, and wherein the lever jig includes an opening/closing door configured to be displaced between an open position where the opening/closing door allows the one of connectors to be attached to the lever jig and a close position where the opening/closing door prevents the one of connectors positioned at the attachment position from being detached from the lever jig, a door holding portion configured to hold the opening/closing door at the close position, and an automatic door opening portion configured to move the opening/closing door at the close position to the open position against a holding force of the door holding portion at a point in time when manipulation to the fitting manipulation completion position is completed in the manipulation from the fitting manipulation start position to the fitting manipulation completion position.

* * * * *